US005624074A

United States Patent [19]
Parisi

[11] Patent Number: 5,624,074
[45] Date of Patent: Apr. 29, 1997

[54] HOSE SUB-ASSEMBLY

[75] Inventor: Bernard Parisi, Barnegat, N.J.

[73] Assignee: Component Hardware Group, Inc., Lakewood, N.J.

[21] Appl. No.: 548,405

[22] Filed: Oct. 26, 1995

[51] Int. Cl.$^6$ ................................................ B05B 15/00
[52] U.S. Cl. ........................ 239/588; 239/600; 285/149; 138/134
[58] Field of Search ........................ 239/525, 588; 285/149, 177, 251, 256; 138/134, 173

[56]  References Cited

U.S. PATENT DOCUMENTS

| | | | |
|---|---|---|---|
| 2,061,987 | 11/1936 | Sorensen | 239/588 X |
| 2,185,741 | 1/1940 | Sorg et al. | 138/134 X |
| 2,971,520 | 2/1961 | Motis et al. | 239/588 X |
| 3,120,966 | 2/1964 | Lyon | 285/149 X |
| 5,263,646 | 11/1993 | McCauley | 239/588 X |

*Primary Examiner*—Andres Kashnikow
*Assistant Examiner*—Steven J. Ganey
*Attorney, Agent, or Firm*—McAulay Fisher Nissen Goldberg & Kiel LLP

[57]  ABSTRACT

The hose sub-assembly is provided with a nozzle assembly at each end which includes a fitting with a flat transverse end surface. In addition, a nut which carries an O-ring in a recess at the end surface is threaded into a sleeve in which the nozzle assembly is mounted. The O-rings provide a flat surface-to-surface sealing arrangement to reduce the risk of damage to the O-ring while enhancing the sealing characteristics. Each nut and O-ring is biased against the nozzle assembly by a stretched outer metal casing.

16 Claims, 3 Drawing Sheets

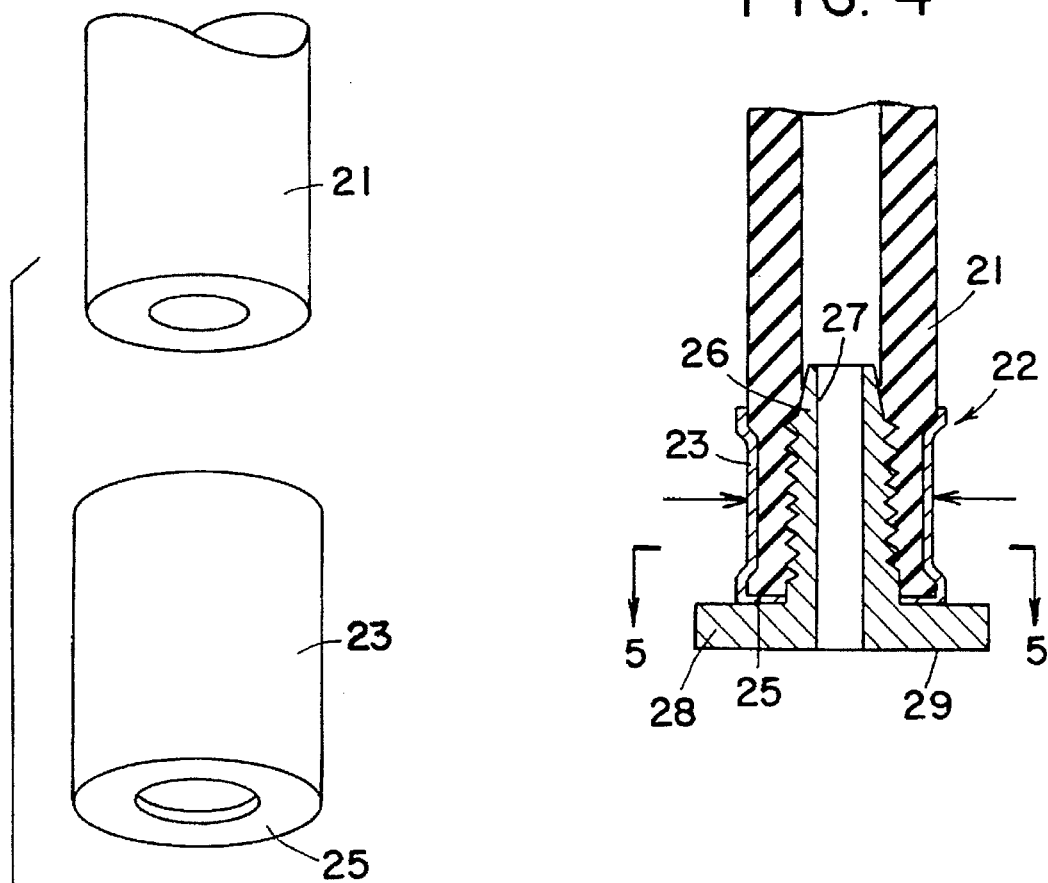
FIG. 4
FIG. 5
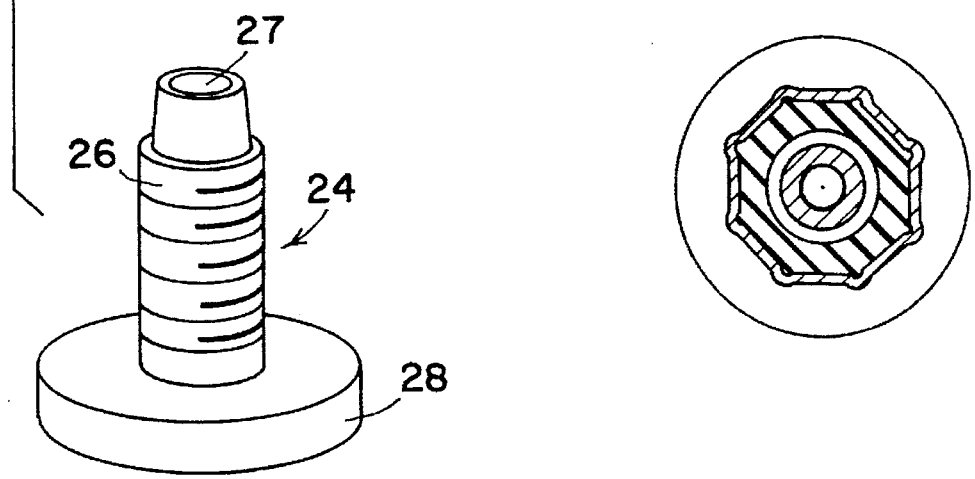
FIG. 6

HOSE SUB-ASSEMBLY

This invention relates to a hose sub-assembly. More particularly, this invention relates to a hose sub-assembly for spray heads.

As is known, various types of water spray assemblies have been employed for the rinsing of dishes, pots, pans, utensils and the like in commercial and institutional establishments. Typically, these water spray assemblies are mounted on or adjacent sinks and are manipulated manually by a dishwasher in order to deliver streams or sprays of water onto the items to be rinsed in the sink. In many cases, the spray assemblies employ a flexible hose which is connected to a water riser pipe to receive a flow of water and a spray head at the end of the hose to deliver multiple sprays of water onto the items to be rinsed. Typically, such assemblies are connected to a vertical riser pipe through which hot water may be delivered.

In the past, the flexible hoses of the known spray assemblies have been secured to the riser pipe by a threaded coupling while the discharge end is coupled to the spray head by a similar coupling. Since the flexible hose would be unsupported throughout its length, accommodations have been made to provide some degree of vertical support to prevent the spray head from simply dropping into the sink. To this end, it has been known to provide a relatively stiff coiled spring or the like about the inlet end of the hose so that the spring provides a degree of vertical support to at least a portion of the hose length. In this way, the discharge end of the hose and the spray head thereon hang downwardly so that the washer may conveniently grip the discharge end of the hose assembly above the level of a sink so that the spray head can be easily directed to the area of the sink desired.

Further, in order to protect the hose assembly and provide some rigidity to the hose assembly, a flexible outer casing of metal has been disposed about the hose in telescopic relation. Typically, the flexible outer casing is secured at each end to the couplings and extends from one end of the hose to the opposite end of the hose.

However, it has been found that through repeated uses and/or mis-uses of such hose assemblies, the metal outer casings tend to fatigue and tear near or at the inlet coupling so that the hose is no longer supported or protected. In time, the hose also fatigues and ruptures at or near the inlet coupling allowing water to leak through. As a result, the hose assembly requires replacement.

In addition, in order to prevent leaks between the hose and the couplings, flat washers have usually been placed between each coupling and the hose. However, should the coupling become loosened to any extent, the sealing characteristics of the washer can become compromised so that leaks occur between the coupling and the hose. Further, where the washers have been made of fiber, rubber or plastic such as a Teflon, excessive tightening of the coupling on the hose can cause damage to the washer to the extent that the sealing characteristics of the washer are compromised.

Accordingly, it is an object of the invention to increase the useable life of a hose sub-assembly for a water spray assembly.

It is another object of the invention to reduce the risk of leakage in a hose sub-assembly for a spray head.

Briefly, the invention provides a hose sub-assembly for a water spray assembly which is comprised of a flexible hose for conveying water, a nozzle assembly at each end of the hose, a sleeve at each end of the hose telescopically receiving the hose and a nozzle assembly therein and a metal casing which is secured to and between the sleeves to telescopically receive the hose.

Each nozzle assembly is constructed with a hollow fitting which is fitted into the flexible hose and a ferrule which is crimped on the hose to secure the fitting in place. The fitting also has a flange which abuts against a shoulder in the sleeve in which the hose end is placed. This flange has a transverse end surface as well as an orifice for passage of the expelled water.

In addition, a nut having an externally threaded stem is threaded into each sleeve at each end of the sub-assembly and includes a transverse end surface opposite the end surface of the fitting flange. In accordance with the invention, an O-ring is disposed between the transverse surfaces of the fitting flange and the nut in order to seal these surfaces relative to each other. In particular, the O-ring is disposed in an annular recess in the transverse end surface of the stem of the nut. Hence, the O-ring is protected from damage should the nut be over-tightened in the sleeve of the sub-assembly. That is to say, if the nut is over tightened, the two transverse end surfaces of the fitting and nut would simply come together while compressing the O-ring into the recess. Typically, the O-ring projects from the annular recess so as to be compressed upon tightening of the nut relative to the fitting.

In accordance with the invention, the nut also has a collar with an internal thread extending from an end of the stem while an annular recess is provided in this end of the stem to receive a second O-ring. In this way, the second O-ring is disposed to seal against a member, such as a riser pipe or spray head, which is threaded into the collar.

In accordance with the invention, a spray head assembly may be threaded directly into the collar of the nut at the discharge end of the hose sub-assembly. In this case, the spray head assembly also has a transverse proximal end surface which sealingly engages the O-ring disposed within the collar of the nut in a similar fashion as the first O-ring sealingly engages against the fitting of the nozzle assembly.

Alternatively, a tubular grip may also be provided between the nut and the spray head assembly in order to facilitate use of the spray head assembly. Such a grip may have an externally threaded stem which threads into the collar of the nut. In addition, this stem may also be provided with an annular recess into which an O-ring is disposed to sealingly engage against the nut.

Still further, a strain relief coil is secured in the sleeve at the inlet end of the hose to extend in reinforcing relation to the metal casing and the hose. This strain relief coil serves to reduce the risk of the metal casing fatiguing under prolonged use and/or misuse.

Still further, a coil spring is mounted at the inlet end of the hose in a conventional fashion to allow the hose assembly to drape in a depending manner at the discharge end for ease of use.

These and other objects and advantages of the invention will become more apparent from the following detailed description taken in conjunction with the accompanying drawings wherein:

FIG. 4 illustrates a cross sectional view of a nozzle assembly secured in a hose in accordance with the invention;

FIG. 5 illustrates a view taken on line 5—5 of FIG. 4; and

FIG. 6 illustrates an exploded view of a nozzle assembly in accordance with the invention.

Figure 1:
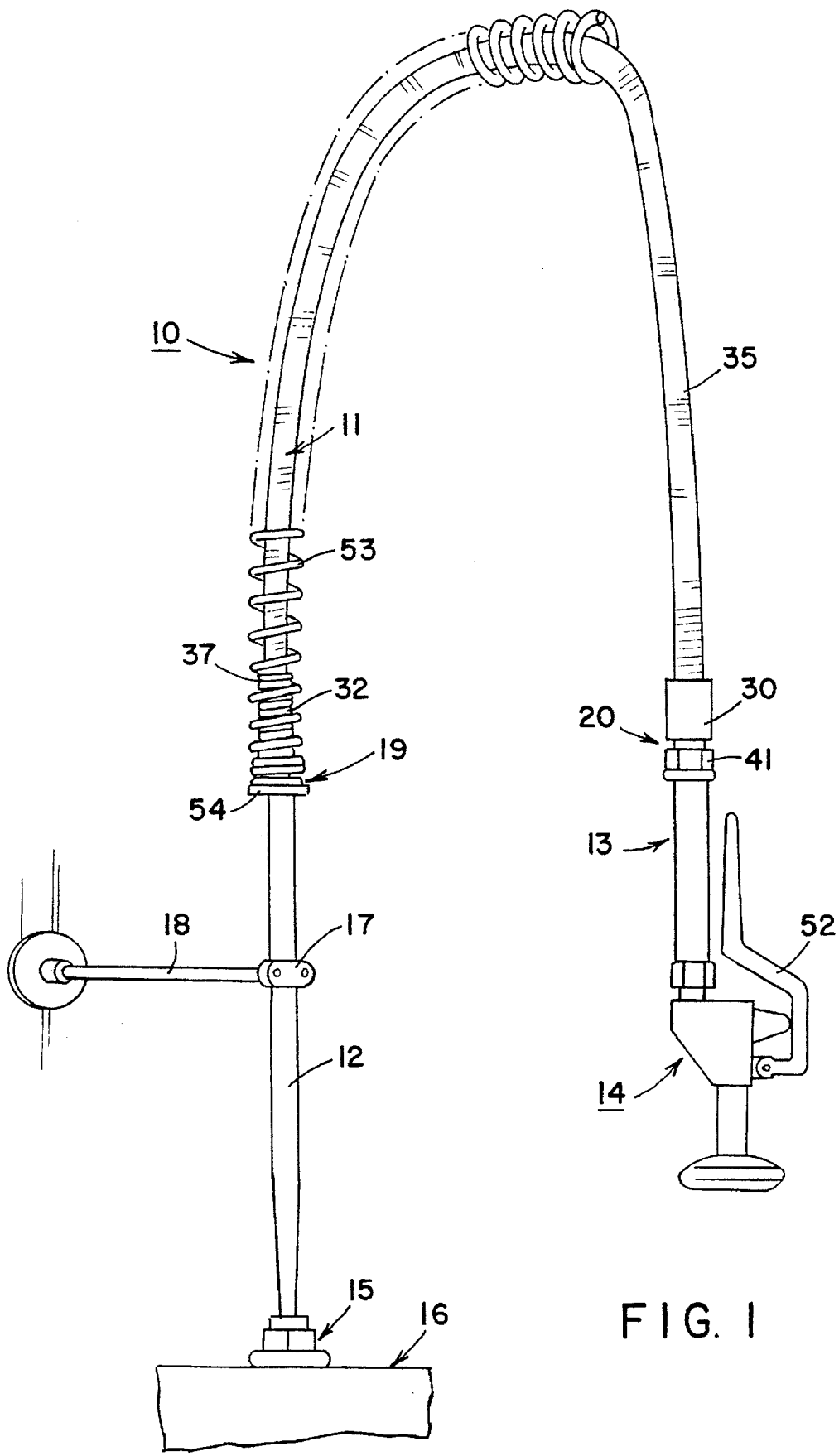
FIG. 1 illustrates a perspective view of a spray head assembly in a position of use in accordance with the invention.

Referring to FIG. 1, the water spray assembly 10 includes a hose sub-assembly 11 which extends from a riser 12, a grip 13 and a spray head assembly 14.

By way of example, the riser 12 is in the form of a vertical pipe through which water may flow from a suitable tap 15 on a sink 16. As shown, the riser 12 is secured at an intermediate point via a clamp 17 to a wall bracket 18. Such a wall bracket is described in pending U.S. patent application Ser. No. 08/459,742 filed Jun. 2, 1995.

The hose sub-assembly 11 has an inlet end 19 secured to the riser 12 as well as a discharge end 20 which is secured to the grip 13.

Figure 2:
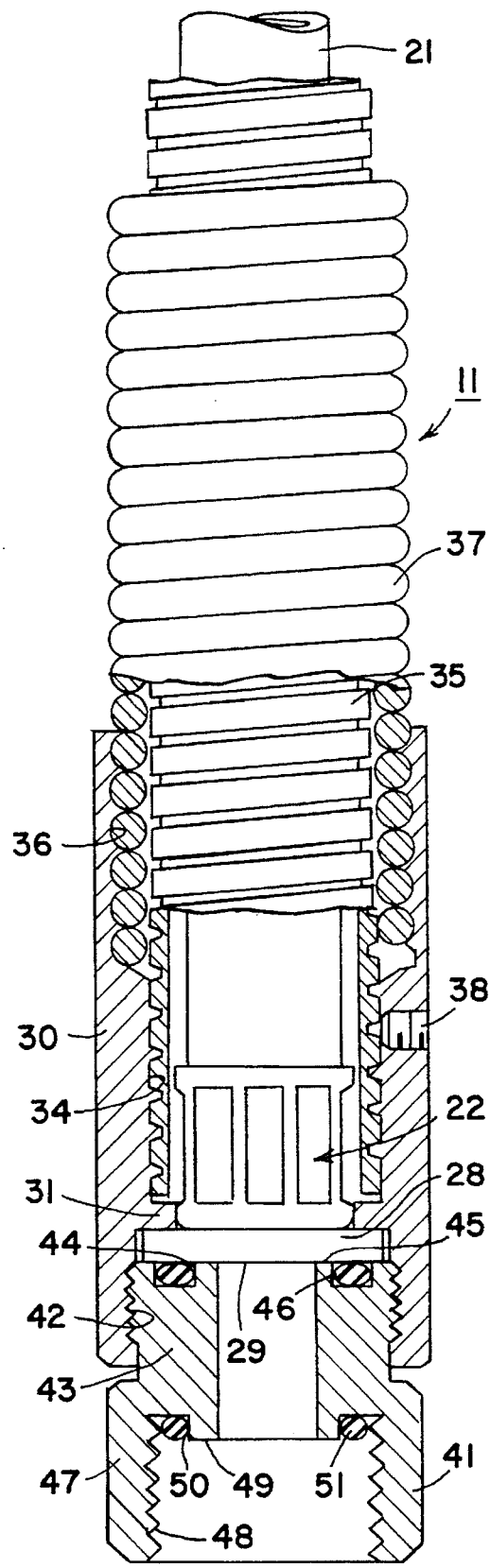
FIG. 2 illustrates a partial cross-sectional view of the inlet end of the hose sub-assembly in accordance with the invention.

Referring to FIG. 2, the hose sub-assembly 11 includes a flexible hose 21, for example made of 3-ply rubber, each end of which is provided with a nozzle assembly 22. Each nozzle assembly 22 is of the same construction so that only one will be further described.

Referring to FIGS. 4 and 6, each nozzle assembly 22 is formed of a ferrule 23 typically made of metal and a threaded fitting 24 of metal. As indicated, the ferrule 23 is initially of cylindrical shape and is sized to slide over the end of the hose 21 with a flat rim 25 at one end to abut the hose 21. In addition, the ferrule 23 is of a thickness so as to be readily crimped circumferentially about the hose 21 as indicated in FIG. 5. The fitting 24 is provided with a threaded stem 26 through which a bore 27 passes in order to convey water therethrough. The threaded stem 26 is threaded into the hose 21 as indicated in FIG. 4. In this respect, the crimping of the ferrule 23 takes place after the stem 26 has been threaded into the hose 21 so as to prevent the fitting 24 from slipping out of the hose 21. The fitting 24 also has an outwardly directed flange 28 which abuts against the end rim 25 of the ferrule 23. This flange 28 provides a flat transverse surface 29 as indicated in FIG. 4 for purposes as described below.

Referring to FIG. 2, the inlet end of the sub-assembly 11 has a sleeve 30 provided with an internal annular shoulder 31 against which the flange 28 of the fitting 24 abuts. Since the fitting 24 is securely held within the hose 21, a substantial pulling force is required on the hose 21 before any slippage of the hose 21 from the fitting 24 may take place. In other words, a firm secure mounting of the inlet end of the hose 21 is made within the sleeve 30 via the nozzle assembly 22.

Figure 3:
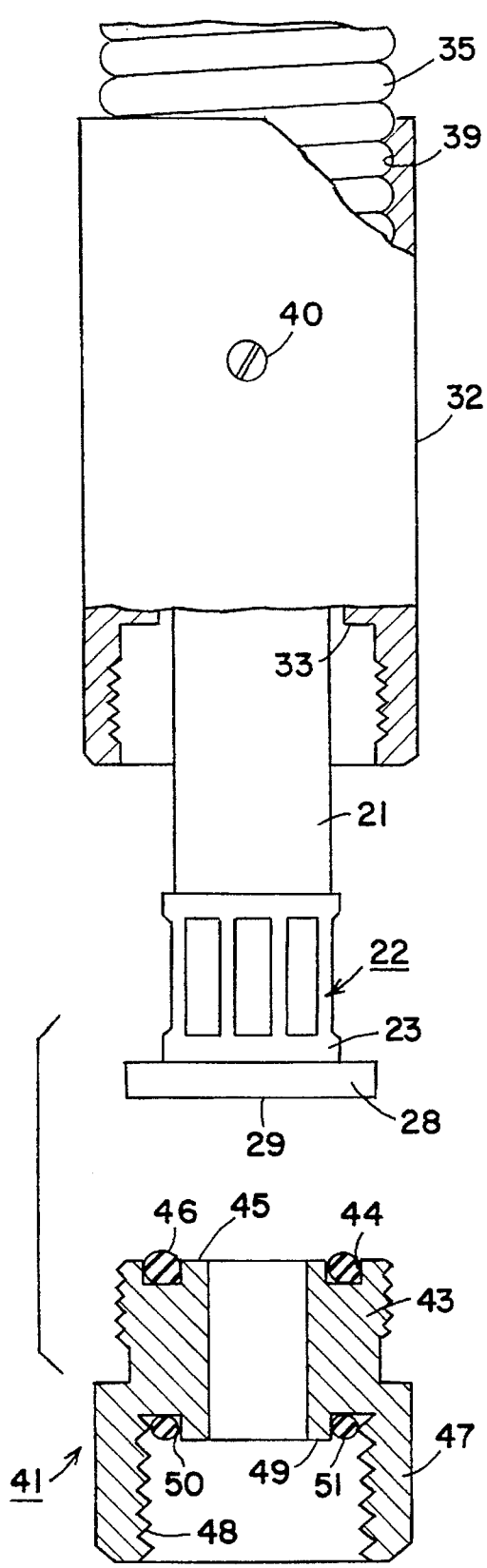
FIG. 3 illustrates a part exploded cross sectional view of the discharge end of a hose sub-assembly in accordance with the invention.

Referring to FIG. 3, the outlet end of the sub-assembly 11 has a sleeve 32 provided with an internal annular shoulder 33 against which the flange 28 of the fitting 24 at the outlet end is to abut.

As shown in FIG. 2, the sleeve 30 is provided with an internally threaded section 34 to threadably receive one end of a spiral wound metal casing 35 in threaded relation. The sleeve 30 also has a second threaded section 36 of larger inside diameter to receive a strain relief coil 37 in threaded relation. This strain relief coil 37 extends for several inches along the length of the metal casing 35 in concentric relation so as to relieve any strain which is imparted on the casing 35 due to excessive flexing of the hose assembly 10.

A set screw 38 is threaded into the sleeve 30 to abut the metal casing 35 in order to prevent unthreading of the casing 35 from the sleeve 30.

Referring to FIG. 3, the sleeve 32 at the discharge end of the sub-assembly 11 has a threaded section 39 to receive the metal casing 35 in threaded relation. The sleeve 32 also is provided with a threaded set screw 40 which secures the sleeve 32 to the casing 35 to prevent rotation therebetween.

Referring to FIGS. 1 and 2, the inlet end of the hose sub-assembly 11 includes a nut 41 which is threaded into a further threaded section 42 of the sleeve 30. As indicated, the nut 41 has a stem 43 which has an external thread received in the threaded section 42 of the sleeve 30. In addition, the end of the stem 43 is provided with an annular recess 44 and a flat transverse end surface 45. An O-ring 46 is disposed in the annular recess 44 and projects slightly therefrom. As shown, the O-ring 46 abuts against the flat transverse surface 29 of the flange 28 of the fitting 24 of the nozzle assembly 22 when the nut 41 has been threaded into place in the sleeve 30.

The nut 41 also has a collar 47 which extends from the stem 43 and which is provided with an internal thread 48. In addition, the distal end of the stem 43 is provided with a flat transverse surface 49 as well as an annular recess 50 in the surface 49 to receive a second O-ring 51.

Referring to FIG. 3, the discharge end of the hose sub-assembly 11 is provided with a nut 41 of identical construction as above. Accordingly, like reference characters have been used to indicate like parts as above. In this respect, the nut 41 may be used at either the inlet end or discharge end of the hose sub-assembly.

In order to assemble the hose sub-assembly 11, various steps may be taken in various sequences.

By way of example only, one manner of assembling the hose sub-assembly 11 is to place the rubber hose 21 within the outer metal casing 35 so that the ends of the hose 21 are exposed. Next, the relief coil 37 is placed over one end of the casing 35 and, thereafter, the sleeves 30 and 32 are threaded onto the ends of the metal casing 35 and fixed thereto via the respective set screws 38, 40. The relief coil 37 may also be threaded into the sleeve 30. Next, the nozzle assemblies 22 are secured to the free ends of the hose 21. In this respect, the ferrule 23 is first slid over the hose 21 and thereafter the stem 26 of the fitting 24 is threaded into the interior of the hose 21. When the fitting 24 has been brought into abutment with the ferrule rim 25, the ferrule 24 is crimped in a suitable crimping operation into the shape as indicated in FIG. 5 so as to secure the threaded stem 26 of the fitting 24 within the hose 21.

Thereafter, the respective nuts 41 are threaded into the respective sleeves 30, 32. For example, the nut 41 at the inlet end of the sub-assembly 11 is first threaded into the sleeve 30. Prior to this point, the metal casing 35 and relief coil 37 are threaded into final position within the sleeve 30 and the set screw 38 tightened in order to secure the casing 35 of the sleeve 30. The nut 41 is then threaded into place so as to bring the O-ring 46 into sealing engagement with the flange 28 of the fitting 22 thereat. At this time, the hose 21 projects beyond the sleeve 32 at the opposite discharge end. The second nut 41 is then threaded into the sleeve 32 while at the same time pushing the exposed end of the nozzle assembly 22 into the sleeve 32 and the flange 28 into abutment with the internal shoulder 34 of the sleeve 33. This also causes the metal casing 35 to stretch. The stretching of the metal casing 35 thus places the hose 21 into compression thereby stiffening the overall sub-assembly 11.

After the second nut 41 has been threaded into place in sealing relation against the fitting 22 at the discharge end, the sleeve 32 may be adjusted or not by rotating relative to the casing 35. In any event, the set screw 40 is tightened in place to prevent unthreading of the casing 35 from the sleeve 32.

The hose sub-assembly may then be secured directly to the spray head assembly 14 or to the grip 13 which is threaded onto the spray head assembly 14. As indicated, the spray head assembly 14 includes a handle 52 for manual actuation of the spray head assembly 14. In addition, the inlet end of the sub-assembly 11 may be threaded onto the riser 12 via the collar of the nut 41 thereat.

Once in place, the hose assembly 10 may be used in a conventional fashion. For example, pivoting of the handle 52 allows water to be discharged through the spray head assembly 14 into the area of the sink 16 in which water is required.

The sealing provided by the flat transverse surfaces of the nuts 41 and the fittings 22 provides a sealing arrangement in which the O-rings 46 cannot be over-stressed. That is, tightening of a nut 41 into the respective sleeve 30, 32 is terminated upon the nut 41 bottoming on the flange 28 of the fitting 24. At this point, the O-ring 46 would be fully compressed between the two surfaces into the recess 44. Thus, a full lock-up can be obtained.

Typically for a ⅝ inch outside diameter O-ring 46, the thickness of the O-ring would be 0.125 inches. Thus, the recess 44 receiving the O-ring would have a depth of a less dimension, for example a depth of 0 . . . inches.

The secure sealing arrangement between the respective ends of the hose assembly 10 and the riser 12 and grip 13 or spray head 14 reduces the risk of leakage.

Further, since the assembly of the sub-hose assembly 11 places the metal casing 35 into a stretched condition relative to the hose 21, the nuts 41 are biased inwardly against the fittings 22 so that the flanges 28 remain in sealing relation with the O-rings 46 should the nuts 41 become loosened during use. That is to say, if a nut 41 were loosened at one end, the stretched outer casing 35 shortens relative to the hose 21 so that the flange 28 of the fitting 24 remains in contact with the O-ring 46 while lifting off the internal 24 shoulder 31, 33 of the sleeve 30, 32.

Further, because of the use of the strain relief coil 37 at the inlet end, the risk of fatigue occurring in the casing 35 at the inlet end is reduced.

Referring to FIG. 1, a coil spring 53 is provided along the inlet half of the hose sub-assembly 11 in order to further rigidity the hose assembly for mounting purposes. For example, the spring 53 abuts a flange or washer 54 secured in place between the riser 12 and the sub-assembly 11. Thus, the coil spring 53 allows a greater portion of the inlet end of the hose sub-assembly 11 to be disposed in a vertical upward direction thereby reducing the amount of drape or droop at the discharge end.

The invention thus provides a hose sub-assembly which can be employed for the mounting of spray heads in a manner to not only reduce the risk of leaks and but also the risk of damage due to fatigue. Further, the invention provides a hose sub-assembly capable of extended useful life.

What is claimed is:

1. A hose sub-assembly comprising
   a flexible hose for conveying water therethrough;
   a nozzle assembly at at least one end of said hose for expelling water therefrom, said nozzle assembly including a hollow fitting secured to said hose for passage of water therethrough, said fitting having an outwardly directed flange with a transverse end surface;
   a sleeve telescopically receiving said hose and said nozzle assembly therein, said sleeve having an internal shoulder abutting said flange and an internal thread;
   a nut having an externally threaded stem threaded into said internal thread of said sleeve, said stem including a transverse end surface opposite said end surface of said fitting; and
   an O-ring disposed between said transverse surfaces of said fitting and said nut to seal said surfaces relative to each other.

2. A hose sub-assembly as set forth in claim 1 wherein said nut includes a collar with an internal thread extending from a distal end of said stem, an annular recess in said distal end of said stem, and a second O-ring disposed in said annular recess to seal against a member threaded into said collar.

3. A hose sub-assembly as set forth in claim 2 which further comprises a spray head assembly threaded into said collar of said nut, said spray head assembly having a transverse proximal end surface sealingly engaging said second O-ring.

4. A hose sub-assembly as set forth in claim 2 which further comprises a tubular grip having an externally threaded stem threaded into said collar of said nut, said stem of said grip having a transverse end surface sealingly engaging said second O-ring.

5. A sub-hose assembly as set forth in claim 1 which further comprises a second nozzle assembly at an opposite end of said hose for passage of water into said hose, said second nozzle assembly having a second hollow fitting secured to said hose for passage of water therethrough, said second fitting having a flange with a transverse end surface; and a second sleeve telescopically receiving said hose and said second nozzle assembly therein.

6. A hose sub-assembly as set forth in claim 5 which further comprises a spiral wound metal casing secured to and between said sleeves with said hose received telescopically therein.

7. A hose sub-assembly as set forth in claim 6 which further comprises a strain relief coil secured in and extending from said second sleeve, said coil receiving one end of said spiral wound metal casing therein in reinforcing relation.

8. A hose sub-assembly as set forth in claim 7 which further comprises a coiled spring mounted at an inlet end of said hose about said second sleeve and extending along said hose and said metal sleeve.

9. A hose sub-assembly as set forth in claim 5 which further comprises a second nut having an externally threaded stem threaded into said second sleeve and including a transverse end surface, and an O-ring disposed between said end surfaces of said fitting of said second nozzle assembly and said second nut in sealing relation.

10. A sub-hose assembly as set forth in claim 9 wherein said second nut has an internally threaded collar for threadably receiving a riser pipe therein.

11. A sub-hose assembly as set forth in claim 1 wherein said fitting has an externally threaded stem threaded into said hose.

12. A sub-hose assembly as set forth in claim 11 further comprising a ferrule disposed over said discharge end of said hose in circumferentially compressed relation to frictionally secure said stem of said fitting in said hose.

13. A hose sub-assembly comprising
   a flexible hose for conveying water therethrough;

a nozzle assembly at at least one end of said hose for expelling water therefrom, said nozzle assembly including a hollow fitting secured to said hose for passage of water therethrough, said fitting having an outwardly directed flange with a transverse end surface;

a first sleeve telescopically receiving said hose and said nozzle assembly therein, said sleeve having an internal shoulder abutting said flange and an internal thread;

a first nut having an externally threaded stem threaded into said internal thread of said sleeve, said stem including a flat end surface opposite said end surface of said fitting;

a first O-ring disposed between said surfaces of said fitting and said nut to seal said surfaces relative to each other;

a second nozzle assembly at an opposite end of said hose for passage of water into said hose, said second nozzle assembly having a second hollow fitting secured to said hose for passage of water therethrough, said second fitting having a flange with a transverse end surface;

a second sleeve telescopically receiving said hose and said second nozzle assembly therein, said second sleeve having an internal shoulder abutting said flange of said second fitting;

a spiral wound metal casing threaded into said sleeves in stretching relation with said hose received telescopically therein;

a second nut having an externally threaded stem threaded into said second sleeve and including a transverse end surface; and a second O-ring disposed between said end surfaces of said second fitting and said second nut in sealing relation.

14. A hose sub-assembly as set forth in claim 13 wherein each said nut includes a collar with an internal thread extending from a distal end of said stem and, an annular recess in said distal end of said stem, and wherein each nut includes another O-ring disposed in said annular recess to seal against a member threaded into said collar.

15. A hose sub-assembly as set forth in claim 14 which further comprises a spray head assembly threaded into said collar of said first nut, said spray head assembly having a transverse proximal end surface sealingly engaging said another O-ring.

16. A hose sub-assembly as set forth in claim 14 which further comprises a tubular grip having an externally threaded stem threaded into said collar of said first nut, said stem of said grip having a transverse end surface sealingly engaging said another O-ring in said first nut.

* * * * *